US012644781B2

(12) United States Patent
Giterman et al.

(10) Patent No.: US 12,644,781 B2
(45) Date of Patent: Jun. 2, 2026

(54) MASS FLOW SENSOR HAVING AN AIRFOIL

(71) Applicant: HarcoSemco LLC, Branford, CT (US)

(72) Inventors: Igor Giterman, Woodbridge, CT (US); Robert A. Croce, Jr., Guilford, CT (US)

(73) Assignee: HarcoSemco LLC, Branford, CT (US)

( * ) Notice: Subject to any disclaimer, the term of this patent is extended or adjusted under 35 U.S.C. 154(b) by 0 days.

(21) Appl. No.: 18/508,314

(22) Filed: Nov. 14, 2023

(65) Prior Publication Data

US 2024/0159601 A1 May 16, 2024

Related U.S. Application Data

(63) Continuation of application No. 17/020,571, filed on Sep. 14, 2020, now Pat. No. 11,846,549.

(60) Provisional application No. 62/899,357, filed on Sep. 12, 2019.

(51) Int. Cl.
| | |
|---|---|
| *G01K 13/02* | (2021.01) |
| *G01F 1/684* | (2006.01) |
| *G01F 1/69* | (2006.01) |
| *G01F 1/696* | (2006.01) |
| *G01K 1/02* | (2021.01) |
| *G01K 1/08* | (2021.01) |
| *G01K 1/14* | (2021.01) |

(52) U.S. Cl.
CPC ............. *G01K 13/02* (2013.01); *G01F 1/684* (2013.01); *G01F 1/6842* (2013.01); *G01F 1/69* (2013.01); *G01F 1/696* (2013.01); *G01K 1/026* (2013.01); *G01K 1/08* (2013.01); *G01K 1/14* (2013.01)

(58) Field of Classification Search
CPC .......... G01K 13/02; G01K 1/026; G01K 1/08; G01K 1/14; G01F 1/684; G01F 1/6842; G01F 1/69; G01F 1/696
See application file for complete search history.

(56) References Cited

U.S. PATENT DOCUMENTS

| | | | | |
|---|---|---|---|---|
| 4,907,446 | A | 3/1990 | Inada et al. | |
| 2013/0152699 | A1* | 6/2013 | Suzuki | G01F 1/64 73/861.02 |
| 2014/0024956 | A1* | 1/2014 | Purdy | G01L 9/00 73/753 |

(Continued)

FOREIGN PATENT DOCUMENTS

DE 102017130950 A1 * 6/2019 ............ G01F 1/684

*Primary Examiner* — Laura Martin
*Assistant Examiner* — Anthony W Megna Fuentes
(74) *Attorney, Agent, or Firm* — Tucker Ellis LLP

(57) ABSTRACT

A Mass Flow Sensor (MFS) is provided and includes an MFS housing, a mounting structure, having a mounting structure top and a mounting structure bottom, wherein the MFS housing is associated with the mounting structure top, a first sensor leg, wherein the first sensor leg extends away from the mounting structure bottom and includes a first temperature measurement device and a heating element. The MFS further includes a second sensor leg, wherein the second sensor leg extends away from the mounting structure and includes a second temperature measurement device and an airfoil structure, wherein the airfoil structure defines an airfoil cavity and is associated with the mounting structure bottom to contain the first sensor leg and the second sensor leg.

18 Claims, 16 Drawing Sheets

(56) References Cited

U.S. PATENT DOCUMENTS

2016/0377487 A1   12/2016  Cheung et al.
2018/0073996 A1*  3/2018  Chattoraj ............ G01N 17/008

* cited by examiner 232B        232A

600

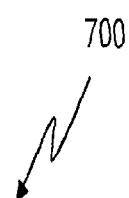
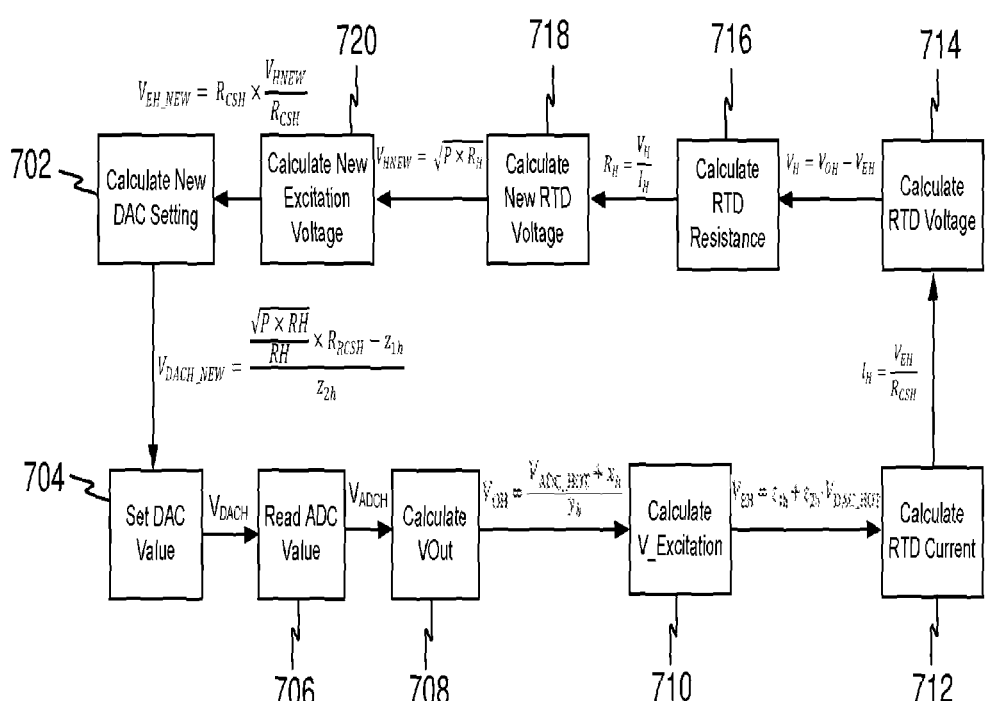
*FIG. 9*

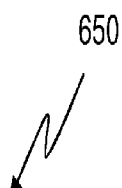
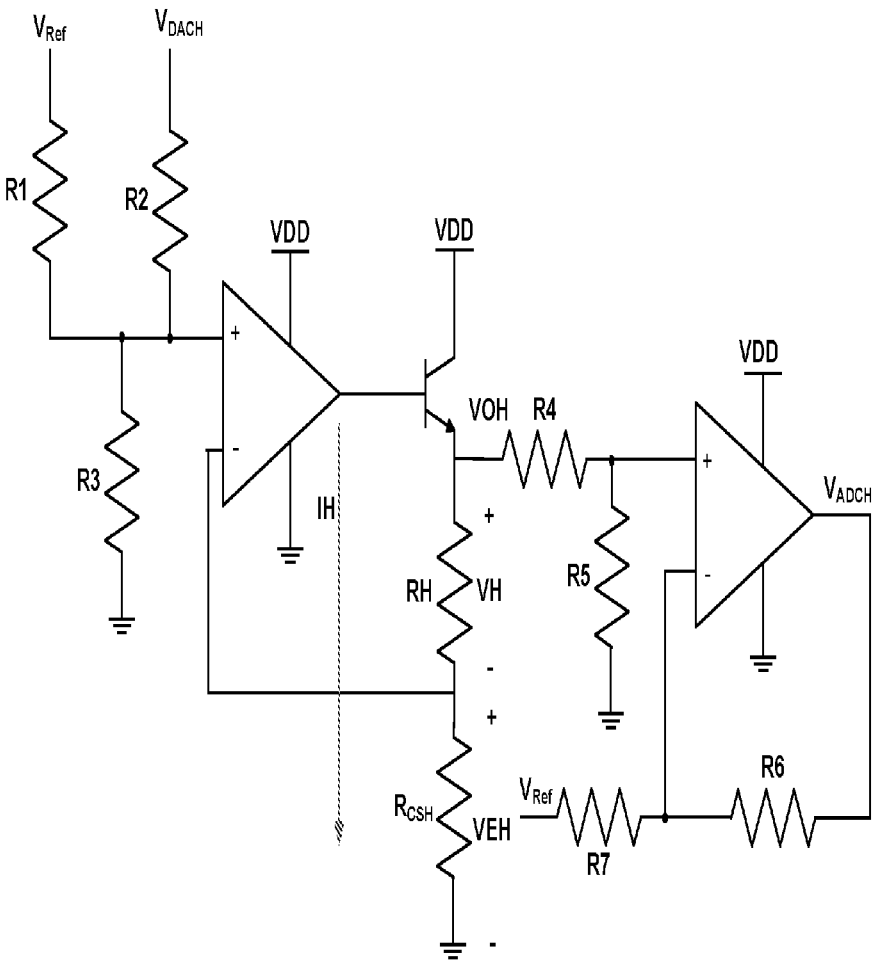
*FIG. 10*

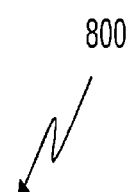
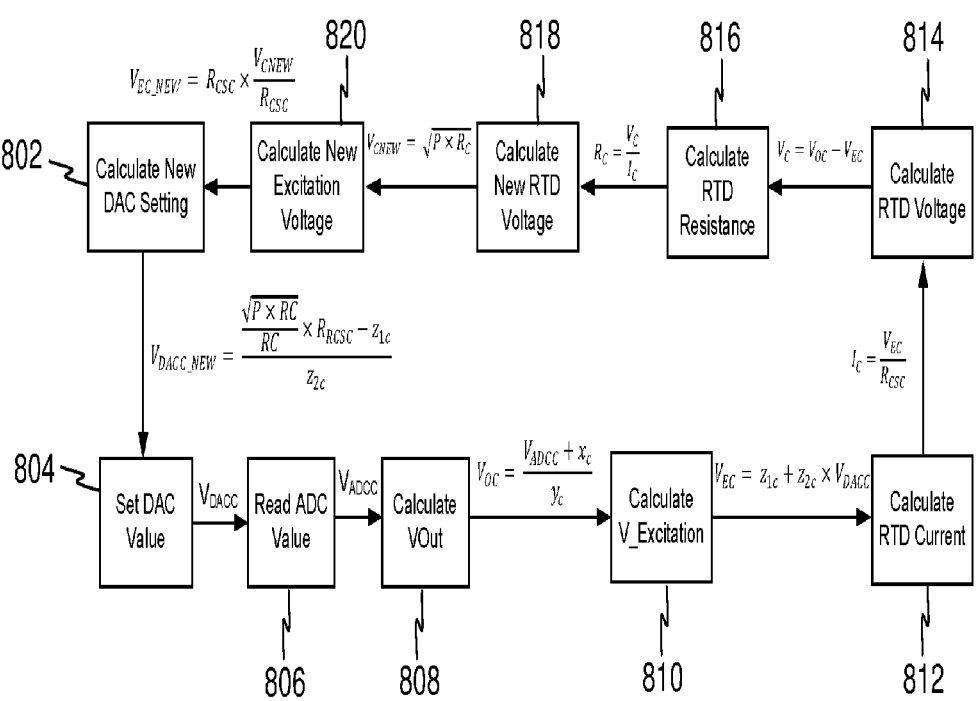
FIG. 11

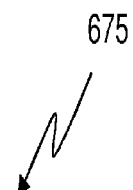
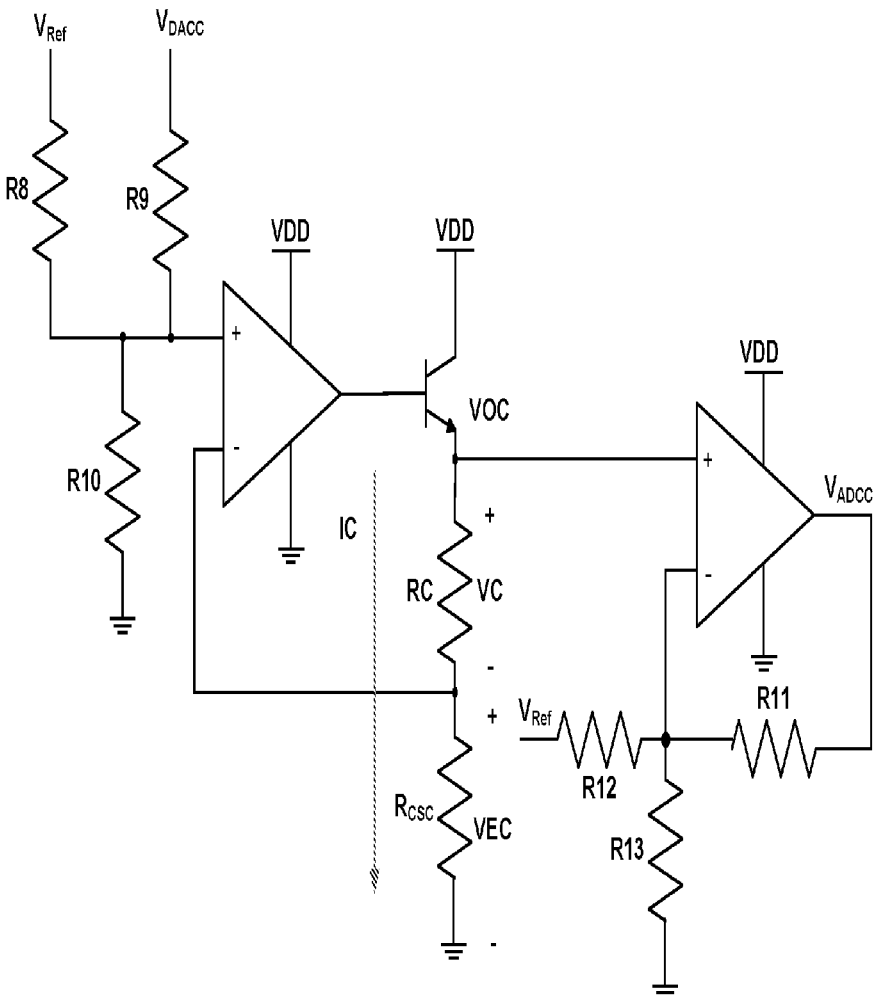
*FIG. 12*

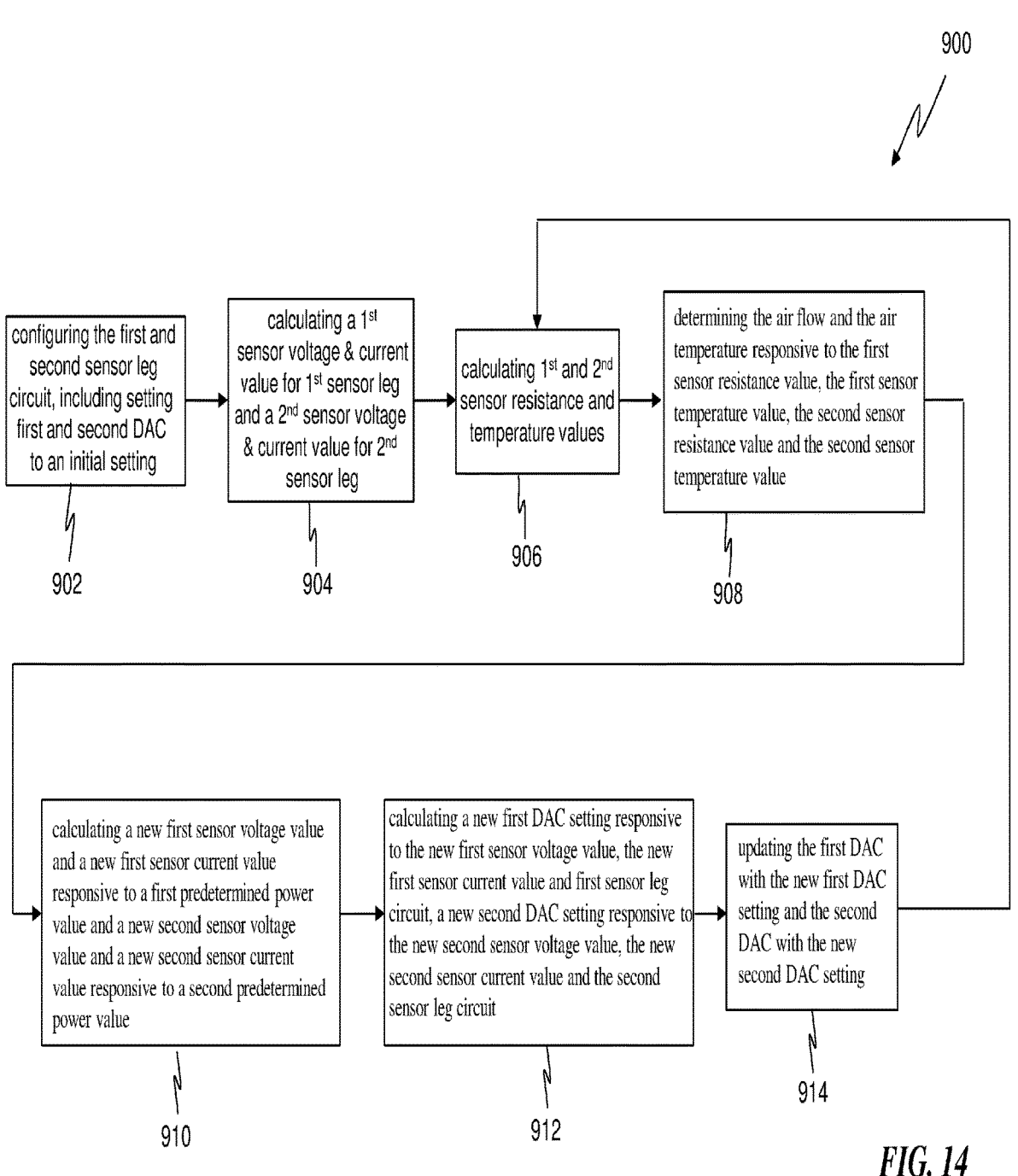

900 configuring the first and second sensor leg circuit, including setting first and second DAC to an initial setting

902 calculating a 1ˢᵗ sensor voltage & current value for 1ˢᵗ sensor leg and a 2ⁿᵈ sensor voltage & current value for 2ⁿᵈ sensor leg

904 calculating 1ˢᵗ and 2ⁿᵈ sensor resistance and temperature values

906 determining the air flow and the air temperature responsive to the first sensor resistance value, the first sensor temperature value, the second sensor resistance value and the second sensor temperature value

908 calculating a new first sensor voltage value and a new first sensor current value responsive to a first predetermined power value and a new second sensor voltage value and a new second sensor current value responsive to a second predetermined power value

910 calculating a new first DAC setting responsive to the new first sensor voltage value, the new first sensor current value and first sensor leg circuit, a new second DAC setting responsive to the new second sensor voltage value, the new second sensor current value and the second sensor leg circuit

912 updating the first DAC with the new first DAC setting and the second DAC with the new second DAC setting

MASS FLOW SENSOR HAVING AN AIRFOIL

RELATED APPLICATIONS

This application is a continuation of U.S. patent application Ser. No. 17/020,571, filed Sep. 14, 2020, which claims the benefit of U.S. Provisional Patent Application No. 62/899,357, filed Sep. 12, 2019, the contents of which are incorporated by reference herein in their entirety.

FIELD OF THE INVENTION

The present invention relates generally to mass flow sensors for aerospace applications, and in particular to sensors for aerospace applications which employ an airfoil-shaped structure to enclose and protect the mass flow sensing elements.

BACKGROUND OF THE INVENTION

Flow sensors are used extensively in the aerospace industry for measuring mass flow at various locations throughout an aircraft. In fact, in today's modern aircraft, there are many systems that require input from these mass flow sensors, such as for example, an aircraft's Environmental Control System (ECS). These mass flow sensors can be outfitted with electronics which are designed to allow the mass flow sensor to provide a temperature compensated analog and/or digital output signal and that is calibrated to the mass flow rate present within a predetermined measurement zone. One problem that currently exists with mass flow sensors is that the sensors are very often located where they can be exposed to harsh environments and may be susceptible to damage from Foreign Object Debris (FOD). This is undesirable because damage to the sensing element(s) from FOD may cause the sensing element to produce erroneous and unpredictable mass flow readings or may stop operating altogether. One such sensor is shown in FIG. 1.

Another problem involves the shape of the sensing element(s). This is because the sensing element(s) may be directly exposed to airflow and thereby may cause or may have a direct effect on the amount of local turbulence in a specific area, in particular in areas that have very high mass flow rates. This is undesirable because local turbulence may cause the sensing element(s) to produce erroneous and unpredictable mass flow readings. Additionally, the shape of the sensing element(s) may also add to the generation of severe ice accretion which can build up directly on the sensing element(s). This also undesirable because build-up of ice on the element(s) can also cause erroneous readings, in particular during phase changes, such as during warming and cooling. Furthermore, the aircraft ECS also has the potential to be damaged when the ice accretions break free from the sensing element(s) and impact other parts of the aircraft structure.

SUMMARY OF THE INVENTION

A Mass Flow Sensor (MFS) is provided and includes an MFS housing, a mounting structure, having a mounting structure top and a mounting structure bottom, wherein the MFS housing is associated with the mounting structure top, a first sensor leg, wherein the first sensor leg extends away from the mounting structure bottom and includes a first temperature measurement device and a heating element. The MFS further includes a second sensor leg, wherein the second sensor leg extends away from the mounting structure and includes a second temperature measurement device and an airfoil structure, wherein the airfoil structure defines an airfoil cavity and is associated with the mounting structure bottom to contain the first sensor leg and the second sensor leg.

A Mass Flow Sensor (MFS) is provided and includes an MFS housing, a mounting structure, having a mounting structure top and a mounting structure bottom, wherein the MFS housing is associated with the mounting structure top, a first sensor leg, wherein the first sensor leg extends away from the mounting structure bottom and includes a first temperature measurement device and a heating element. The MFS further includes a second sensor leg, wherein the second sensor leg extends away from the mounting structure and includes a second temperature measurement device and an airfoil structure, wherein the airfoil structure defines an airfoil cavity and is associated with the mounting structure bottom to contain the first sensor leg and the second sensor leg.

A Method for determining Mass Flow Rate (MFR) of an area using a Mass Flow Sensor (MFS) is provided, wherein the MFS includes, a first sensor leg having a first sensor leg circuit, wherein the first sensor leg circuit includes a first sensor resistance, a first Digital-to-Analog Converter (DAC) and a first Analog-to-Digital Converter (ADC), and a second sensor leg having a second sensor leg circuit, wherein the second sensor leg circuit includes a second sensor resistance, a second Digital-to-Analog Converter (DAC) and a second Analog-to-Digital Converter (ADC). The method includes configuring the first sensor leg circuit and the second sensor leg circuit, wherein configuring include setting the first DAC and the second DAC to an initial set of DAC values. The method also includes calculating a first sensor voltage value and a first sensor current value for the first sensor leg circuit and a second sensor voltage value and a second sensor current value for the second sensor leg circuit. The method further includes processing, wherein processing includes, processing the first sensor voltage value and the first sensor current value for the first sensor leg circuit to calculate a first sensor resistance value and a first sensor temperature value, processing the second sensor voltage value and the second sensor current value for the second sensor leg circuit to calculate a second sensor resistance value and a second sensor temperature value, and determining the air flow and the air temperature responsive to the first sensor resistance value, the first sensor temperature value, the second sensor resistance value and the second sensor temperature value. The method further includes calculating a new first sensor voltage value and a new first sensor current value responsive to a first predetermined power value and a new second sensor voltage value and a new second sensor current value responsive to a second predetermined power value. Additionally, the method includes calculating a new first DAC setting responsive to the new first sensor voltage value, the new first sensor current value and first sensor leg circuit, a new second DAC setting responsive to the new second sensor voltage value, the new second sensor current value and the second sensor leg circuit, updating the first DAC with the new first DAC setting and the second DAC with the new second DAC setting. At this point the processing process may be repeated.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 9 is an operational block diagram illustrating a method for controlling power and reading resistance on the hot leg, in accordance with one embodiment of the invention.

FIG. 10 illustrates a schematic of an electronic circuit configured to control power across the hot RTD over the full temperature range using the method of FIG. 9, in accordance with one embodiment of the invention.

FIG. 11 is an operational block diagram illustrating a method for controlling power and reading resistance on the cold leg, in accordance with one embodiment of the invention.

FIG. 12 illustrates a schematic of an electronic circuit configured to control power across the cold RTD over the full temperature range using the method of FIG. 11, in accordance with one embodiment of the invention.

FIG. 14 is an operational block diagram illustrating a method for determining Mass Flow Rate (MFR) using a Mass Flow Sensor (MFS), in accordance with one embodiment of the invention.

DETAILED DESCRIPTION

Figure 1:
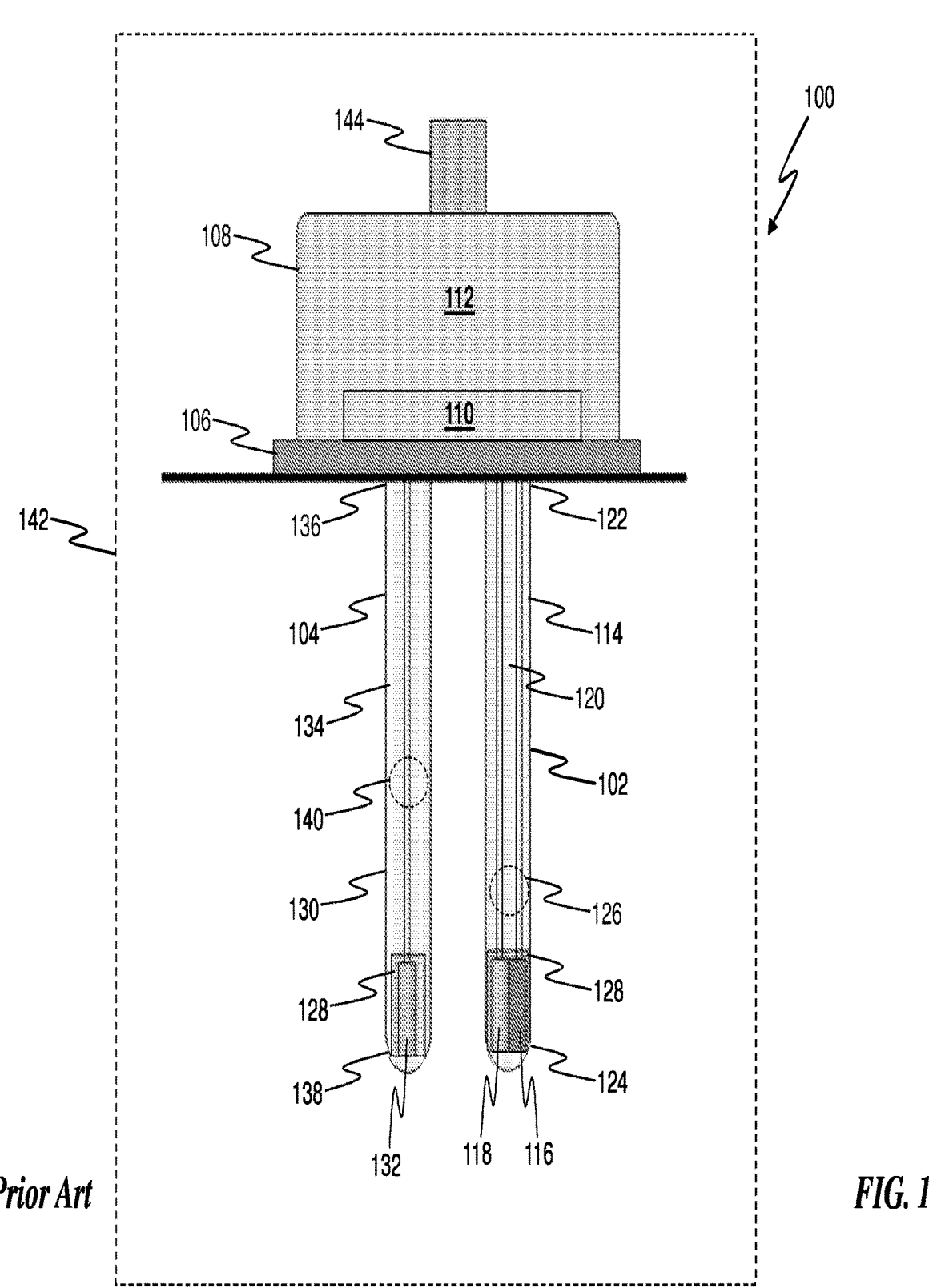
FIG. 1 is a schematic block diagram showing a thermal dispersion-typemass flow meter, in accordance with the prior art.

As discussed hereinafter and in accordance with the present invention, a mass flow sensor is provided, wherein the mass flow sensor is enclosed within an airfoil-shaped structure thereby allowing for a unique way of employing the thermal dispersion principle to measure mass air flow. The unique and novel design of the present invention not only provides for a stabilized fluid flow profile within the vicinity of the sensing element(s), it also provides for protection of the element(s) against FOD and prevents severe ice accretion on the sensing elements. Moreover, the unique and novel design of the present invention also allows for the sensing legs to have a reduced and/or miniaturized size as compared to conventional thermal dispersion-type sensors. It should be appreciated that in existing mass flow sensor designs, in order to operate correctly, the sensing leg must be large enough to accommodate both a heating element as well as a sensing element. However, the present invention avoids this limitation in that a single element can be used for both heating and sensing. This advantageously not only reduces the cost and weight of the sensors, but it also reduces the sensor thermal mass, thereby yielding a faster sensor time response which is desirable for many avionics' control loop applications.

One way the present invention accomplishes this is by enclosing the sensing elements within a unique and novel airfoil strut-shaped housing that provides many aerodynamic and environment benefits. For example, at very high air flow speeds, the aerodynamic shape of this enclosure reduces local turbulence in the area of the sensor sensing tips. This reduction in turbulence is advantageous because this local turbulence can create erroneous and unpredictable mass flow readings. Additionally, as discussed briefly hereinabove, the enclosure of the present invention provides protection of the sensing elements from FOD which may be present within the sensing environment. This protection allows the sensing legs to be reduced and/or miniaturized in size and/or structure (thereby having a reduced structural integrity and mass) without the concern of the sensors being damaged due to sensing element deflection at high air speeds and ice accretion and/or FOD due to a reduction in structural integrity. Moreover, the direction of the air flow into and out of the airfoil strut enclosure inherently prevents severe ice accretion directly on the sensing elements. This prevention of ice accretion further reduces erroneous readings due to ice build-up and phase changes when the sensor undergoes warming and cooling cycles.

Furthermore, the time response of the sensor is a vital parameter to take into consideration when employing thermal dispersion-type sensors into aircraft systems. Conventional thermal dispersion-type sensors typically utilize two (2) temperature measurement devices in each leg (one for heating and one for measuring). However, in accordance with one embodiment of the present invention, the present invention includes a unique and novel design that also reduces the physical size of the probes by removing one of the sense measurement devices, wherein power to the device may be applied simultaneously while measuring its temperature through a discrete analog network in conjunction with a unique and novel software algorithm.

Generally, thermal mass flow meters are known in the art and are typically used to measure the total mass flow rate of a fluid, primarily gases, that are flowing through a conduit. These type of flow meters use the physical laws of heat transport in fluid flow to measure the mass flow. The flow output measurement is typically accomplished by means of applying the thermal dispersion principle which is obtained by measuring the difference in resistance between two Resistive Temperature Detectors (RTDs) that are subjected to the same rate of fluid flow. In this type of configuration, one RTD (RTD 1) serves as a reference and is typically maintained at the ambient temperature of the airstream (or fluid), while the other RTD (RTD 2) is typically heated to a predetermined temperature using a discrete heating element (such as another RTD or other type of heating element as desired). The difference in resistance between the two RTD elements (RTD1 and RTD2) is produced as a result of the local temperature difference between the two RTD elements (RTD1 and RTD2) and this difference in resistance is converted to the desired electrical output signal (i.e. either digital or analog).

Referring again to FIG. 1, a thermal dispersion-type flow sensor device 100 is shown, in accordance with the prior art. The thermal dispersion-type flow sensor device 100 includes a first sensor leg 102, a second sensor leg 104, a mounting flange 106, an electronics housing 108 and device electronics 110, wherein the electronics housing 108 defines an electronics housing cavity 112 and wherein the device electronics 110 are located within the electronics housing cavity 112. The first sensor leg 102 includes a first sensor leg housing 114, a heating element 116 and a first temperature measurement device 118 (such as an RTD), wherein the first sensor leg housing 114 defines a first sensor leg cavity 120 and includes a first leg mounting end 122 and a first leg sensor end 124. The heating element 116 and first temperature measurement device 118 include first leg electrical leads 126 which electrically connect the heating element 116 and first temperature measurement device 118 with the device electronics 110, wherein the heating element 116 and the first temperature measurement device 118 are located within the first sensor leg cavity 120 to be located proximate the first leg sensor end 124. The heating element 116 provides for local heating of the first sensor leg 102. Moreover, the heating element 116 and first temperature measurement device 118 may typically be pre-coated with a thermally conductive and electrically insulative material and the first sensor leg cavity 120 is typically filled with a thermally conductive and electrically insulative potting material 128.

The second sensor leg 104 includes a second sensor leg housing 130 and a second temperature measurement device 132 (such as an RTD), wherein the second sensor leg housing 130 defines a second sensor leg cavity 134 and includes a second leg mounting end 136 and a second leg sensor end 138. The second temperature measurement device 132 includes a second leg electrical lead 140 which electrically connects the second temperature measurement device 132 with the device electronics 110, wherein the second temperature measurement device 132 is located within the second sensor leg cavity 134 to be located proximate the second leg sensor end 138. Moreover, the second temperature measurement device 132 is typically pre-coated with a thermally conductive and electrically insulative material and the second sensor leg cavity 134 is typically filled with a thermally conductive and electrically insulative potting material 128. The second temperature measurement device 132 measures the ambient air stream temperature. Additionally, the first sensor leg 102 and the second sensor leg 104 are directly exposed to the air stream or other sensing media inside of a measurement area of interest 142, such as inside a conduit or pipe. It should be appreciated that typically, the thermal dispersion-type flow sensor device 100 is located to be centered within the area of interest 142. Furthermore, the first sensor leg 102 and the second sensor leg 104 are sized the same in order to balance the thermal mass of each leg. Moreover, the thermal dispersion-type flow sensor device 100 includes an electrical connector 144 which is electrically connected to the device electronics 110 located with the electronics housing 108. The electrical connector 144 is configured to allow the thermal dispersion-type flow sensor device 100 to be in electrical connection with other electronic systems such as an avionics' system.

The device electronics 110 are configured to process the output of the heating element 116, the first temperature measurement device 118 and the second temperature measurement device 132 to generate a flow measurement output signal which is communicated to other electronic systems, such as an avionics' system via the electrical connector 144. The flow measurement output signal 144 is typically produced by means of the thermal dispersion principle, which is obtained by measuring the difference in temperature between the two sensing elements 118, 132 when they are subjected to the same fluid flow and same rate of fluid flow, in this case the first temperature measurement device 118 and the second temperature measurement device 132. This is accomplished by maintaining the second sensor leg 104 at the ambient temperature of the airstream (i.e. media flow) and heating the first sensor leg 104 to a predetermined temperature. The difference in temperature between the first temperature measurement device 118 and the second temperature measurement device 132 is produced as a result of the local temperature difference and is signal conditioned and temperature compensated via the device electronics 110. The electronics used to control the heating element 116, the measurement of the resistance and any signal conditioning and temperature compensation may be configured as needed and/or by specific design requirements, as desired.

Figure 2A:
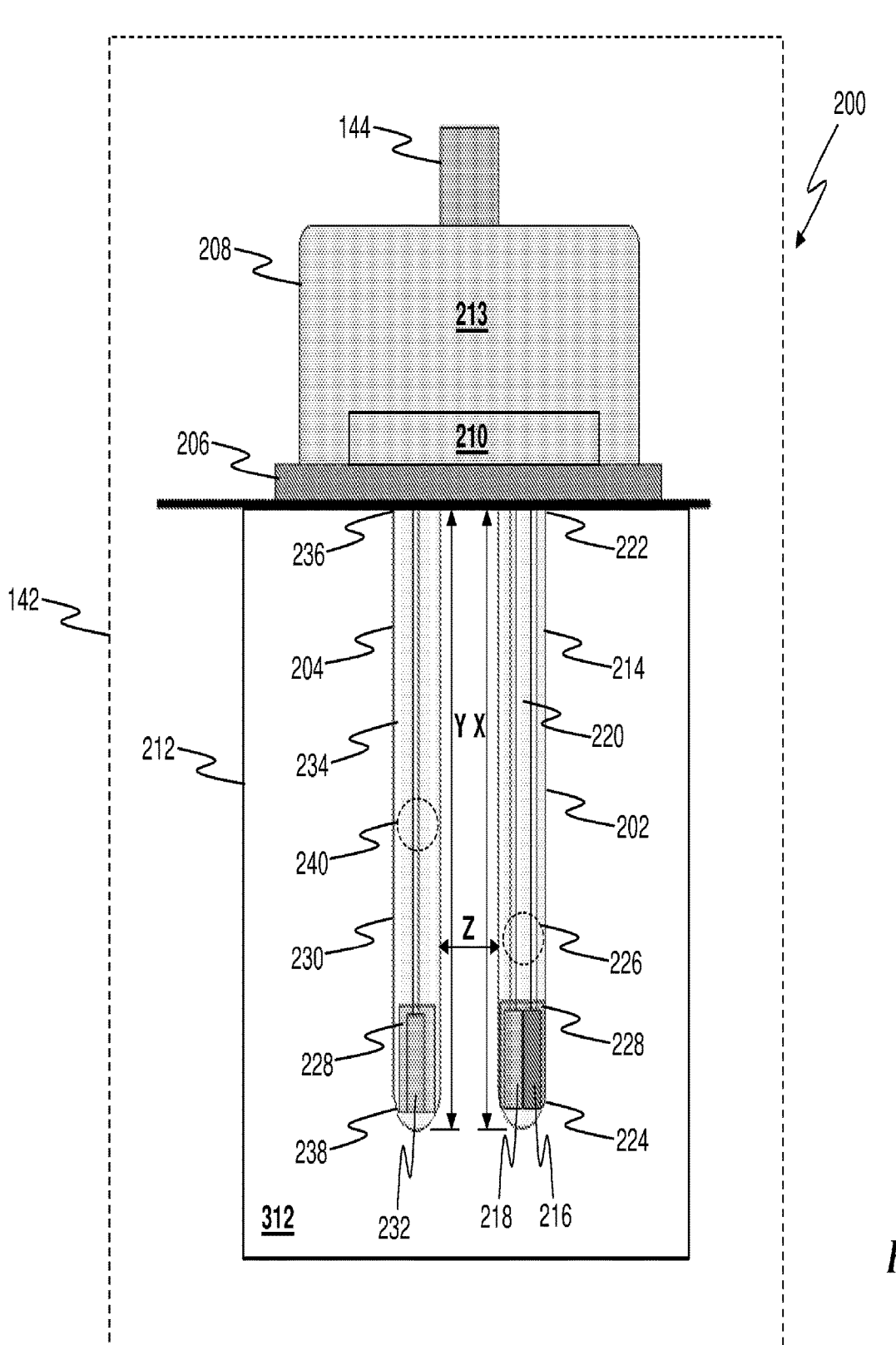
FIG. 2A is a schematic block diagram showing a mass flow meter having an airfoil enclosure, in accordance with one embodiment of the invention.

Referring to FIG. 2A, a Mass Flow Sensor (MFS) 200 is shown in accordance with one embodiment of the invention and includes a first sensor leg 202, a second sensor leg 204, a mounting flange 206, an MFS housing 208, device electronics 210 and an airfoil enclosure 212, wherein the MFS housing 208 defines an MFS housing cavity 213 and wherein the device electronics 210 are located within the MFS housing cavity 213. The first sensor leg 202 includes a first sensor leg housing 214, a heating element 216 and a first temperature measurement device 218 (such as an RTD), wherein the first sensor leg housing 214 defines a first sensor leg cavity 220 and includes a first leg mounting end 222 and a first sensor leg sensor end 224. The heating element 216 and first temperature measurement device 218 include first leg electrical leads 226 which electrically connect the heating element 216 and first temperature measurement device 218 with the device electronics 210, wherein the heating element 216 and the first temperature measurement device 218 are located within the first sensor leg cavity 220 to be located proximate the first sensor leg sensor end 224. It should be appreciated that in one embodiment, the thermal dispersion-type flow sensor device 200 may be located within an area of interest 242, such as a pipe of conduit, to be centered within the area of interest 242. However, it is contemplated that in one embodiment, the thermal dispersion-type flow sensor device 200 may be located in any location within the area of interest 242 desired suitable to the desired end purpose.

It should be appreciated that the heating element 216 provides for local heating of the first sensor leg 202. Moreover, the heating element 216 and first temperature measurement device 218 may be pre-coated with a thermally conductive and electrically insulative material and the first sensor leg cavity 220 may be at least partially filled with a thermally conductive potting material 228. It should be appreciated that in other embodiments, the heating element 216 and first temperature measurement device 218 may be located anywhere within the first sensor leg cavity 220. It should be further appreciated that the first sensor leg 202, 402 and/or second sensor leg 204, 404 may include more than one heating element 216 and/or more than one first temperature measurement device 218, located at various areas within the first sensor leg cavity 220 as desired.

The second sensor leg 204 includes a second sensor leg housing 230 and a second temperature measurement device 232 (such as an RTD), wherein the second sensor leg housing 230 defines a second sensor leg cavity 234 and includes a second leg mounting end 236 and a second sensor leg sensor end 238. The second temperature measurement device 234 includes a second leg electrical lead 240 which electrically connects the second temperature measurement device 232 with the device electronics 210, wherein the second temperature measurement device 232 is located within the second sensor leg cavity 234 to be located proximate the second sensor leg sensor end 238. Moreover, the second temperature measurement device 232 may be pre-coated with a thermally conductive and electrically insulative material and the second sensor leg cavity 234 may be at least partially filled with a thermally conductive potting material 228. It should be appreciated that the second temperature measurement device 232 is configured to measure the ambient air stream temperature.

It should be appreciated that in one embodiment, the first sensor leg 202, 402 includes a first sensor length X and the second sensor leg 204, 404 includes a second sensor length Y, wherein X is sufficiently large such that the first sensor leg sensor end 224 and/or the heating element 216 may be located at a sufficient distance away from the mounting flange 206 such that heat generated by the heating element 216, 416 does not conduct (or minimally conducts) heat into the mounting flange 206 and/or the second sensor leg 204, 404 so as not to affect the sensor readings from the second sensor leg 204, 404. In one embodiment, the first sensor length X may be approximately 10 diameters, while in other embodiments other distances may be used and may or may not be situation specific. Moreover, in one embodiment, the first sensor leg 202, 402 and second sensor leg 204, 404 may be located relative to each other to be separated from each other by a distance Z which may be sized to cause the first sensor leg 202, 402 and second sensor leg 204, 404 to be located at a sufficient distance apart from each other such that radiation of the heat generated by the heating element 216, 416 does not affect the sensor readings from the second sensor leg 204, 404.

It should be appreciated that in still other embodiments, the first sensor leg 202, 402 and/or second sensor leg 204, 404 may include one or more additional temperature sensing elements as desired, suitable to the desired end purpose. For example, in one embodiment, an addition temperature sensing element may be added to one of the first sensor leg 202, 402 and/or second sensor leg 204, 404 to be located proximate to the mounting flange 206 (and/or on the mounting flange 206). This may advantageously allow for the detection of any heat conduction up the sensor leg 202, 402, 204, 404 and/or flange 206 as it differs from the sensed air and may provide further correction/accuracy.

Figure 2B:
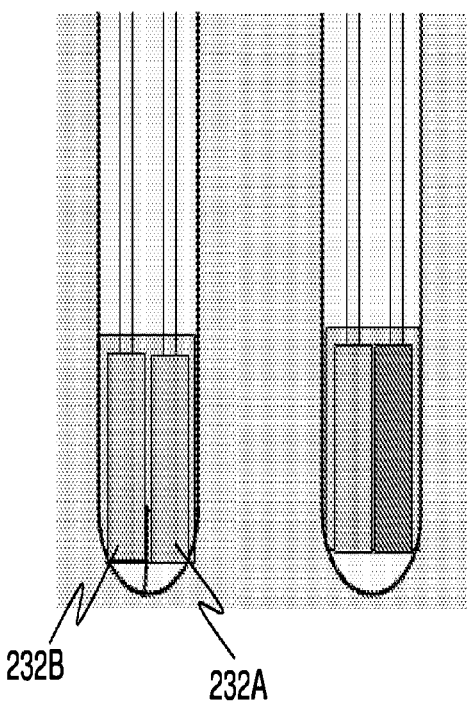
FIG. 2B is a schematic block diagram showing a mass flow meter having an airfoil enclosure and a 'dummy' RTD to balance the thermal mass, in accordance with one embodiment of the invention.

It should be further appreciated that in other embodiments, the second temperature measurement device 232 may be located anywhere within the second sensor leg cavity 234 and/or may include more than one second temperature measurement device 232 which may be located at various areas within the second sensor leg cavity 234 as desired. Referring to FIG. 2B, it another embodiment, the second sensor leg 204 may include more than one second temperature measurement device 232 (such as a first second temperature measurement device 232A and a second temperature measurement device 232B), as desired. It should be further appreciated that in one embodiment the first sensor leg 202 and the second sensor leg 204 may be similarly sized in order to balance the thermal mass of the system. While in other embodiments only one RTD may be used to measure the temperature and thus a "dummy" RTD which does not provide any output may be included to balance the thermal mass and to take up space inside of the sensor leg 202, 402, 204, 404.

Figure 3:
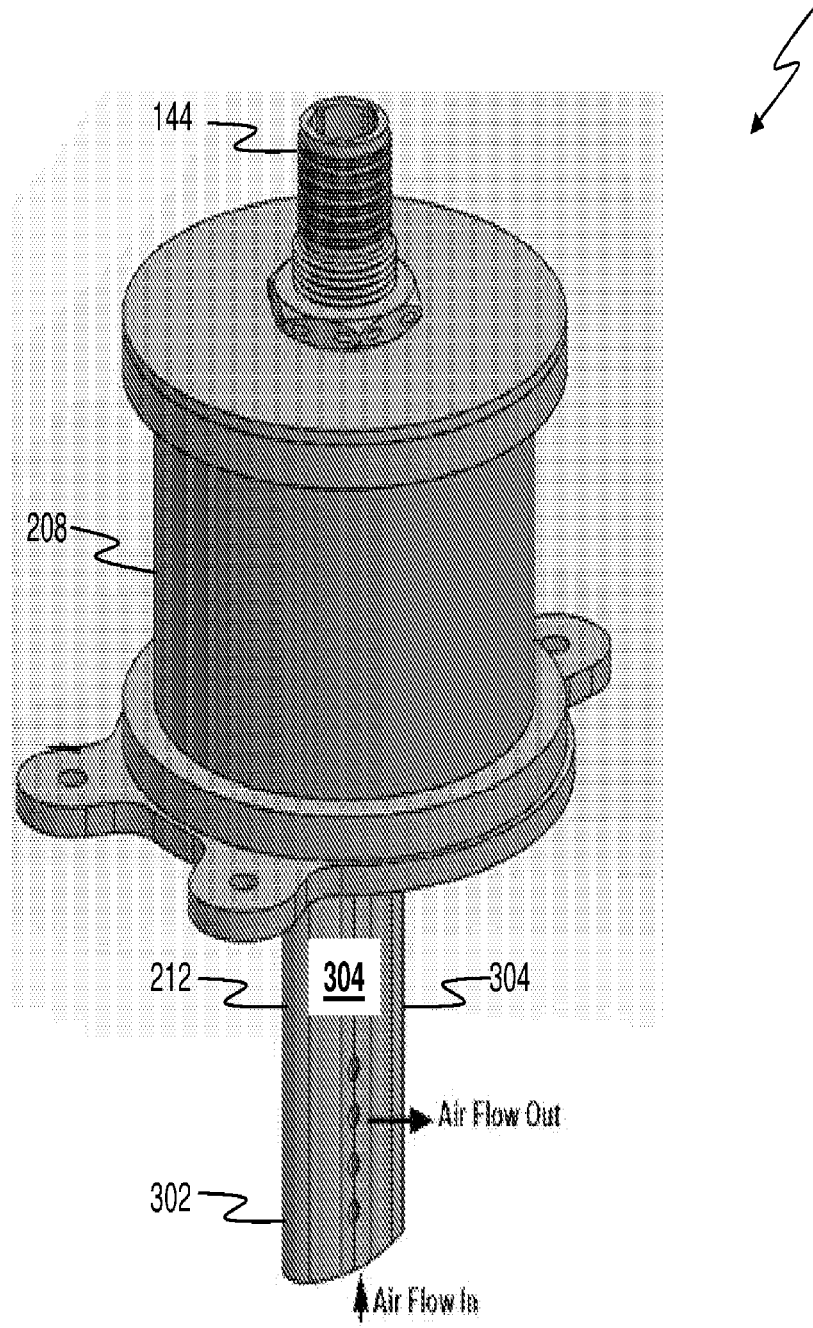
FIG. 3 is a top down, side view of the mass flow meter of FIG. 2, in accordance with one embodiment of the invention.
Figure 4:
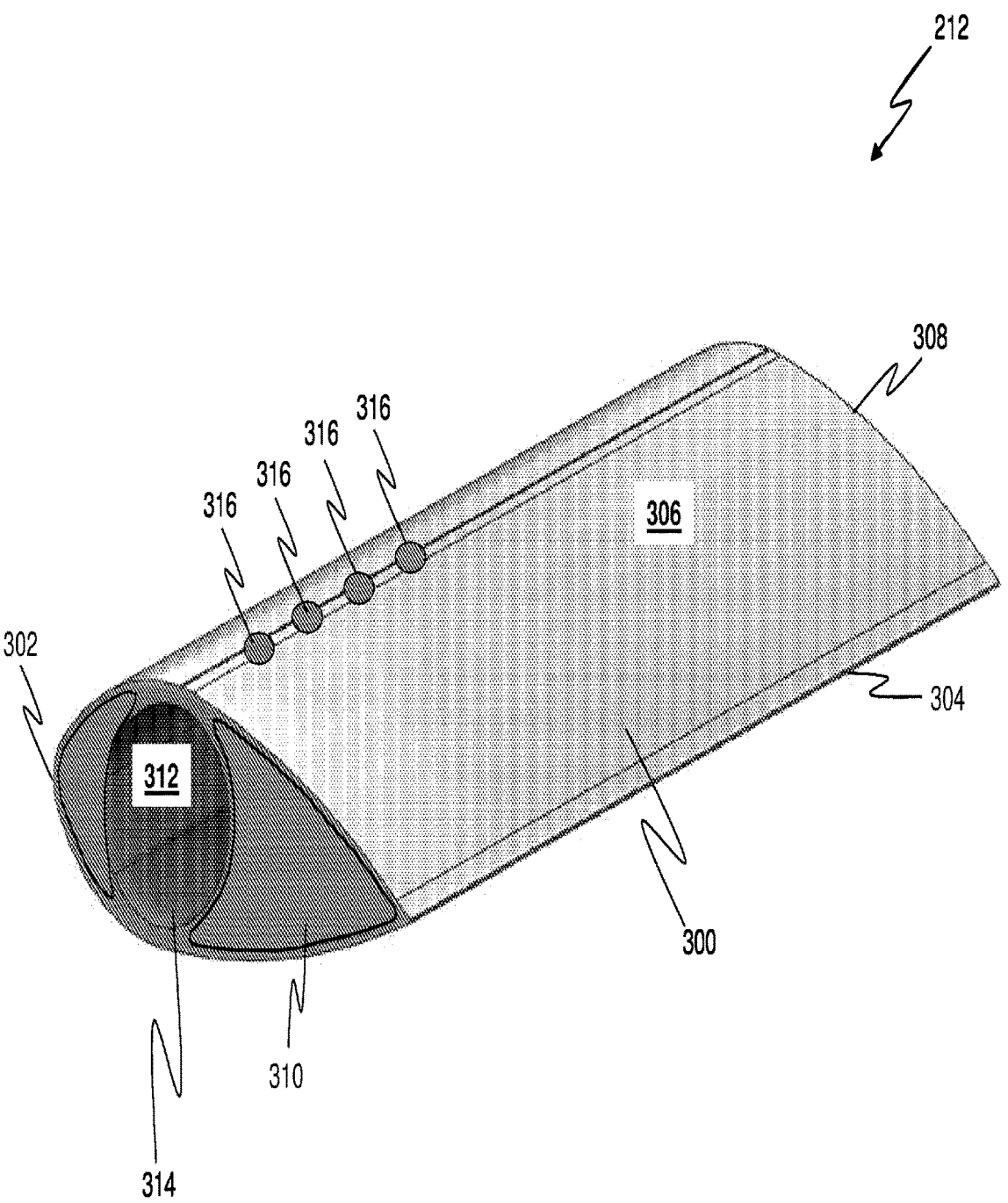
FIG. 4 is an airfoil enclosure for use with the mass flow meter of FIG. 2 and FIG. 3, in accordance with one embodiment of the invention.

In accordance with one embodiment of the invention and referring to FIG. 3 and FIG. 4, the airfoil enclosure 212 includes a strut structural housing 300 which includes a strut housing leading edge 302, a strut housing trailing edge 304, strut housing sides 306, a strut housing top 308 and a strut housing bottom 310. The strut structural housing 300 defines a strut cavity 312, at least one bottom opening 314 in the strut housing bottom end 310 and at least one side vent opening 316 on at least one side of the strut housing sides 306. It should be appreciated that the at least one bottom opening 314 and/or the at least one side vent opening 316 may be communicated with the strut cavity 312. It should be appreciated that the airfoil enclosure 212 is securely connected to (or integrated with) the mounting flange 206 such that the first sensor leg 202 and second sensor leg 204 are located within the strut cavity 312. It should be appreciated that in one embodiment, the airfoil enclosure 212 may have a modified NACA 0024 airfoil profile, while in other embodiments the airfoil enclosure 212 may be any airfoil shaped desired and suitable to the desired end purpose. In one embodiment, the mass flow sensor system 200 may be disposed such that the strut housing leading edge 302 is facing into the direction of the airflow (i.e. upstream) and the strut housing trailing edge 304 is facing along the direct of airflow (i.e. downstream). Referring again to FIG. 4, in this configuration the media flow (i.e. air flow) is introduced into the strut cavity 312 via the at least one bottom opening 314. The media flow then flows through the strut cavity 312, across and over the first sensing leg 302 and second sensing leg 304 and exits out of the at least one side vent opening 316. It should be appreciated that the airfoil enclosure 212 may include a plurality of bottom openings 314 and/or a plurality of side vent openings 316.

Figure 5:
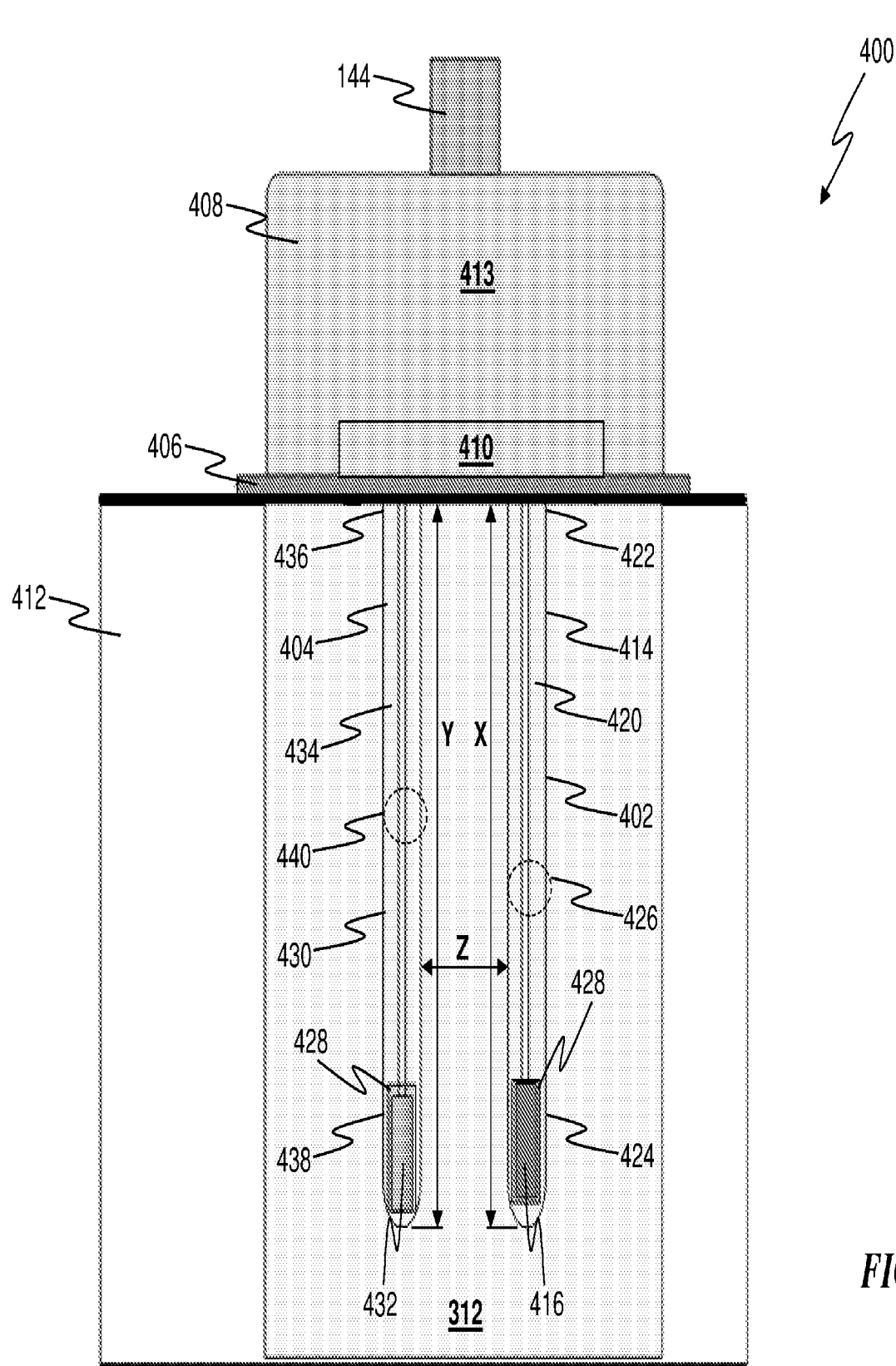
FIG. 5 is a schematic block diagram showing a mass flow meter having an airfoil enclosure, in accordance with another embodiment of the invention.

Referring to FIG. 5, a Mass Flow Sensor 400 is shown in accordance with another embodiment and includes a first sensor leg 402, a second sensor leg 404, a mounting flange 406, an MFS housing 408, device electronics 410 and a strut 412, wherein the MFS housing 408 defines an MFS housing cavity 413 and wherein the device electronics 410 are located within the MFS housing cavity 413. The first sensor leg 402 includes a first sensor leg housing 414 and a heating element 416, wherein the first sensor leg housing 414 defines a first sensor leg cavity 420 and includes a first leg mounting end 422 and a first leg sensor end 424. The heating element 416 includes first leg electrical leads 426 which electrically connect the heating element 416 with the device electronics 410, wherein the heating element 416 is located within the first sensor leg cavity 420 to be located proximate the first leg sensor end 424. It should be appreciated that the heating element 416 provides for local heating of the first sensor leg 402. Moreover, the heating element 416 may be pre-coated with a thermally conductive and electrically insulative material and the first sensor leg cavity 420 may be at least partially filled with a thermally conductive potting material 428. It should be appreciated that in other embodiments, one or more heating elements 416 may be used and the heating elements 416 may be located as desired within the first sensor leg cavity 420.

The second sensor leg 404 includes a second sensor leg housing 430 and a second temperature measurement device 432 (such as an RTD), wherein the second sensor leg housing 430 defines a second sensor leg cavity 434 and includes a second leg mounting end 436 and a second leg sensor end 438. The second temperature measurement device 432 includes a second leg electrical lead 440 which electrically connects the second temperature measurement device 432 with the device electronics 410, wherein the second temperature measurement device 432 is located within the second sensor leg cavity 434 to be located proximate the second leg sensor end 438. Moreover, the second temperature measurement device 432 may be pre-coated with a thermally conductive and electrically insulative material and the second sensor leg cavity 434 may be at least partially filled with a thermally conductive potting material 428. It should be appreciated that the second temperature measurement device 432 is configured to measure the ambient air stream temperature. It should be further appreciated that in other embodiments, more than one second temperature measurement device 432 may be used and may be located anywhere within the second sensor leg cavity 434.

It should be appreciated that in this embodiment, the first sensor leg 402 and second sensor leg 404 are reduced in size and/or miniaturized by reducing the diameter of the first sensor leg housing 414 and second sensor leg housing 430 relative to the prior art sensor leg housings 114, 130, which in turn is dependent upon the sizes of the heating element 416 and the second temperature measurement device 432. Referring again to FIG. 1, it should be apparent that in conventional designs, the diameter of the enclosures (i.e. the first sensor leg housing 414 and second sensor leg housing 430) may be determined according to the sensor leg with dual sensing elements (i.e. the heater element and the hot sensing element). In this embodiment, the heating element 416 is configured to heat the first sensor leg 402 and measure the resistance of the sensing heating element 416. As such, the hot sensing element 218 can be removed and only the heater element 416 can be used. Accordingly, rather than applying power to the heater element 416 and then measuring the signal from the hot sensing element 218 as in conventional designs, the device electronics 410 of this embodiment incorporates a processing device configured to execute a control algorithm which simultaneously heats and measures the resistance of both sensing elements 416, 432. It should be appreciated that in this embodiment, in order to obtain a measurable differential signal, the power applied to the hot leg (heater element 416) is substantially greater than the power applied to the cold leg (sensing element 432). Thus, the cold leg 432 power must be sufficiently low in order to avoid errors due to self-heating effects. The difference in measured resistance of the hot leg 416 and cold leg 432 indicates the mass airflow speed. It should be appreciated that the device electronics 210, 410 of the MFS 100, 200 may incorporate a processing device configured to execute a control algorithm, wherein operates the heating element 216, 416, the first temperature measurement device 218, 418 and the second temperature measurement device 232, 432.

Figure 6:
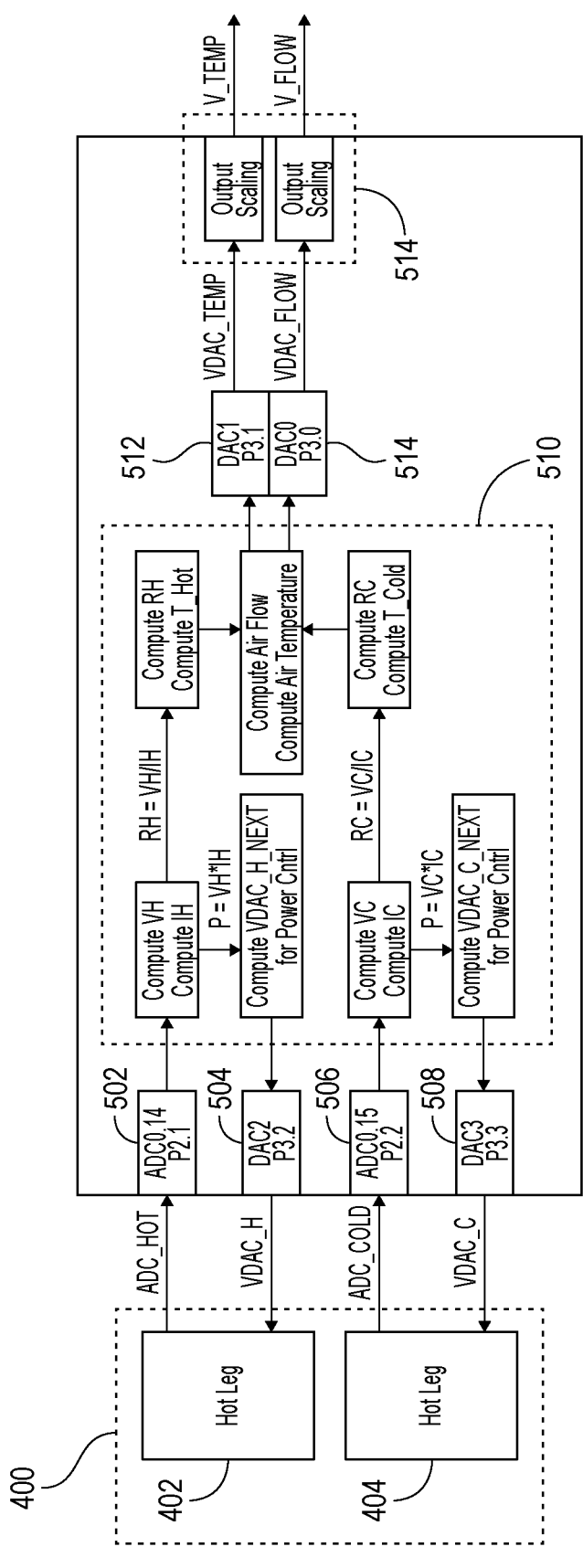
FIG. 6 illustrates a schematic block diagram of an article for controlling power and measuring resistance using the mass flow sensor of FIG. 2 and FIG. 4.

In accordance with one embodiment of the invention and referring to FIG. 5 and FIG. 6, a processing article 500 for controlling power and measuring resistance from the mass flow sensor 400 of FIG. 5 is shown and includes a mass flow sensor 400 having a first sensor leg 402 having a single hot element 416 (i.e. hot leg) and a second sensor leg 404 having a second temperature measurement device 432 (i.e. cold leg). The processing article 500 may include a Hot Leg Analog-to-Digital Converter (HLADC) 502, a Hot Leg Digital-to-Analog Converter (HLDAC) 504, a Cold Leg Analog-to-Digital Converter (CLADC) 506, a Cold Leg Digital-to-Analog Converter (CLDAC) 508, a processing device (with or without external circuitry as desired) 510, a Temp Digital-to-Analog Converter (TDAC) 512, a flow Digital-to-Analog Converter (FDAC) 514 and scaling circuitry 514 for scaling the outputs of TDAC 512 and FDAC 514. It is contemplated that in one embodiment, the scaling of the outputs of TDAC 512 and FDAC 514 may be accomplished via the processing device 510.

Figure 7:
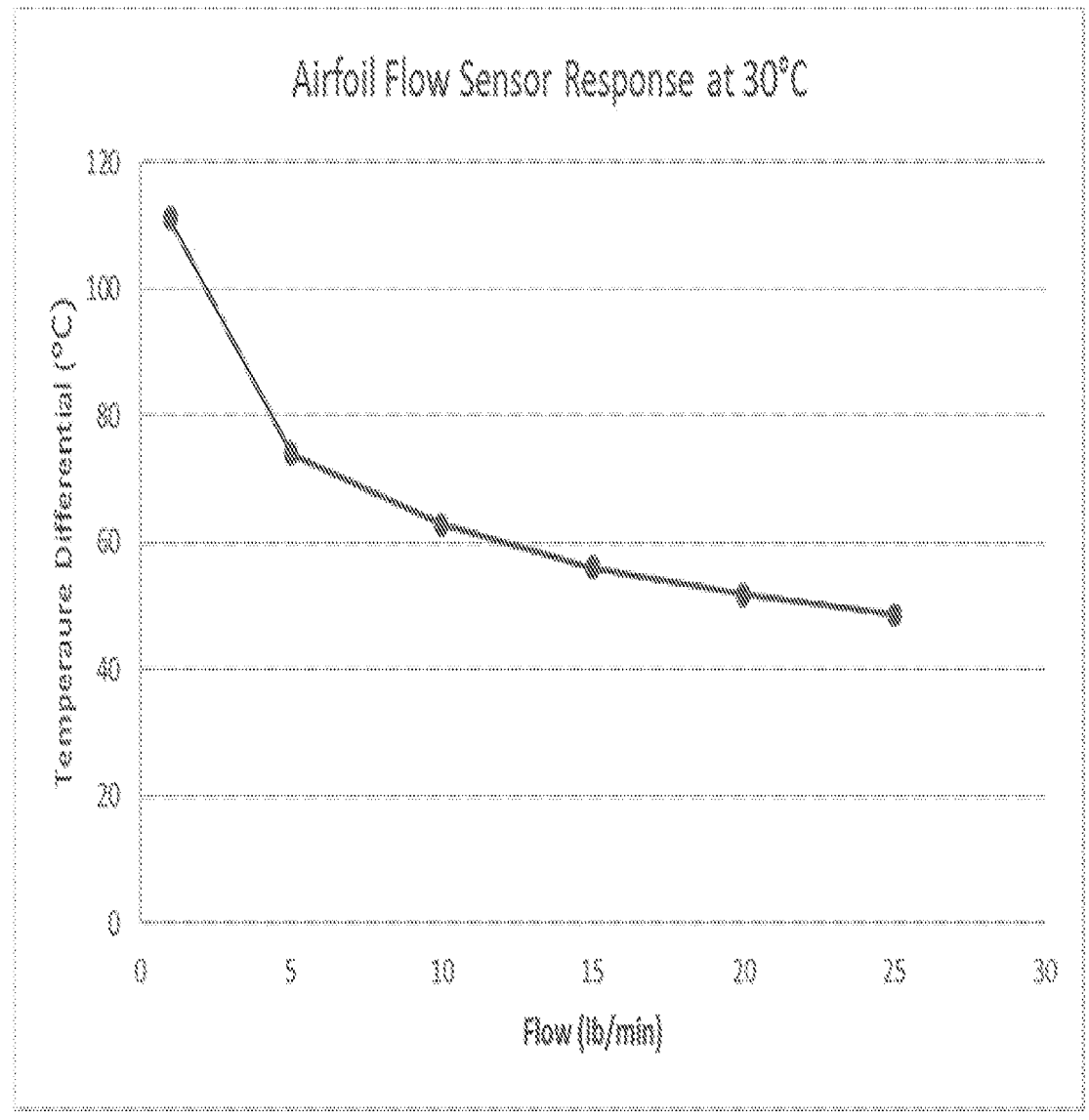
FIG. 7 shows experimental data from the airfoil flow sensor, wherein the measured temperature differential is plotted vs applied airflow.
Figure 8:
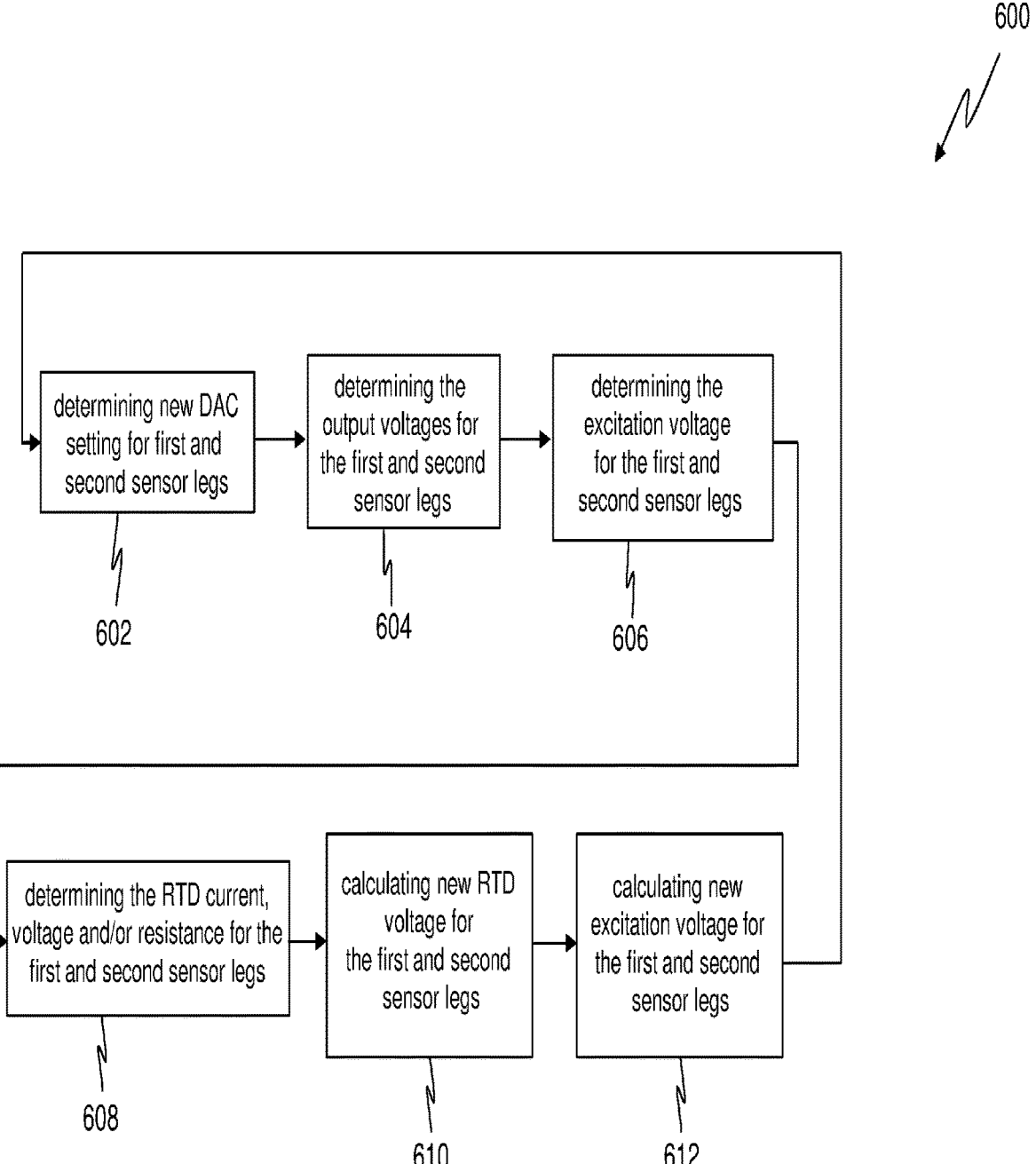
FIG. 8 is an operational block diagram illustrating a method for controlling power and measuring resistance using the mass flow sensor of FIG. 2 and FIG. 5, in accordance with one embodiment of the invention.

FIG. 7 illustrates the operational response of the airflow sensor at 30° C., in accordance with one embodiment. The operational description that follows is in reference to the hot leg 402. In accordance with one embodiment of the invention, and referring to FIG. 8, an operational block diagram illustrating a method 600 for controlling power and measuring resistance using the mass flow sensor 400 and the processing article 500 is provided and includes initializing the power to the mass flow sensor 400 and operating the mass flow sensor 400 in a predetermined area. The method 600 includes determining new Digital-to-Analog (DAC) settings for the first sensor leg 402 (i.e. hot leg) and the second sensor leg 404 (i.e. cold leg), as shown in operational block 602. The method 600 further includes determining the output voltages for the first sensor leg 402 and the second sensor leg 404, as shown in operational block 604, and the excitation voltages for the first sensor leg 402 and the second sensor leg 404, as shown in operational block 606. Additionally, the method 600 includes determining the RTD current, voltage and/or the resistance for the first and second sensor legs 402, 404, as shown in operational block 608. The new RTD voltages are calculated for the first sensor leg 402 and the second sensor leg 404, as shown in operational block 610, and the excitation voltages for the first sensor leg 402 and the second sensor leg 404 are calculated, as shown in operational block 612.

Essentially, in one embodiment, the signals from the first sensor leg 402 are digitized via the HLADC 502, wherein the voltage VH and current IH across the sensing element 402 may be based on hardware coefficients. Accordingly, both the current power applied to the sensing element 402 and the current resistance (temperature if using an RTD) is known. The current power is determined, and the current power value is compared with the desired power value and the HLADC 502 is adjusted in response. This closes the feedback loop. In this manner, IH and VH are used to control the applied power and measure the differential signal to both elements. The signals from the second sensor leg 404 are digitized via CLADC 504, wherein the voltage VC and current IC across the sensing element 404 may be based on hardware coefficients. Accordingly, both the current power applied to the sensing element 404 and the current resistance (temperature if using an RTD) is known. The current power value is compared with the desired power value and the CLADC 504 is adjusted in response. The resistance RH for the hot leg 402 and the resistance RC for the cold leg 404 are then determined and the air flow and the air temperature may be computed.

In accordance with one embodiment of the invention, a method for controlling power, measuring resistance and calculating mass air flow and temperature via the mass flow sensor 400 of FIG. 5 is shown, wherein the mass flow sensor 400 includes the first sensor leg 402 having a single hot element 416 (i.e. the hot leg) and the second sensor leg 404 having a second temperature measurement device 432 (i.e. cold leg). The operational description that follows discusses the hot leg 402 and the cold leg 404 separately.

Referring to FIG. 9, an operational block diagram illustrating a method 700 for controlling power and read resistance on the single hot element 416 (i.e. the hot RTD) is shown in accordance with one embodiment. FIG. 10 illustrates one embodiment of an electronic circuit 650 which may be used for controlling the power across the single hot element 416 (i.e. the hot RTD) over the full temperature range via the method 700, wherein the electronic circuit 650 is configured to achieve the following coefficient relationships:

$$x_h = Vref \times \frac{R6}{R7}$$

$$y_h = \frac{R5}{R5+R4} \times \left(1 + \frac{R6}{R7}\right)$$

$$z_{1h} = \frac{R1\|R3}{R2+(R1\|R3)}$$

$$z_{2h} = \frac{R2\|R3}{R1+(R2\|R3)}$$

It should be appreciated that, in one embodiment, the resistor values for the electronic circuit 650 that determine the coefficients $x_h$, $y_h$, $z_{1h}$ and $z_{2h}$ may be set to achieve constant power across the full operating temperature, and it is typically desired to utilize the full input span of VADCH in the microcontroller. Moreover, at the first iteration, a known DAC voltage ($V_{DACH}$) is set to resistance network R2 and the analog to digital conversion voltage ($V_{ADCH}$) is measured. This value, along with the coefficients "x" and "y" are used to calculate VOut_Hot (VOH). V_Excitation (VE) is calculated using the coefficients $z_{1h}$ and $z_{2h}$ along with the current DAC voltage ($V_{DACH}$). From VE and the current sense resistance ($R_{CSH}$), the current flowing through the heater can be calculated as $I_H = V_E/R_{CSH}$. The heater voltage can be calculated as $V_H = V_{OH} - VE$ and the heater resistance can be calculated as $R_H = V_H/I_H$. Once all present values are known, the updated $V_{DACH}$ to maintain the desired power level can be calculated. The heater voltage and heater current which satisfies the desired power level is then calculated and the $V_{DACH}$ is updated accordingly and the process is repeated. This method is given in more detail herein after.

Referring again to FIG. 9 and FIG. 10, the method 700 includes calculating an initial and/or a new DAC ($V_{DACH\_NEW}$) setting, as shown in operational block 702, wherein $V_{DACH\_NEW}$ is given by:

$$V_{DACH\_NEW} = \frac{\frac{\sqrt{P \times RH}}{RH} \times R_{RCSH} - z_{1h}}{z_{2h}}$$

Once the new DAC setting is calculated, then the DAC value is set, as shown in operational block 704. At this point, the ADC value ($V_{ADCH}$) is read, as shown in operational block 706, and the output voltage VOut is calculated, as shown in operational block 708, wherein VOut is given by:

$$V_{OH} = \frac{V_{ADC\_HOT} + x_h}{y_h}.$$

The V_Excitation ($V_{EH}$) is then calculated, as shown in operational block 710, wherein $V_{EH}$ is given by:

$$V_{EH} = z_{1h} + z_{2h} \cdot V_{DAC\_HOT}.$$

Using these values, the RTD Current ($I_H$) is calculated, as shown in operational block 712, wherein $I_H$ is given by:

$$I_H = \frac{V_{EH}}{R_{CSH}}.$$

The RTD Voltage ($V_H$) is calculated, as shown in operational block 714, wherein $V_H$ is given by:

$$V_H = V_{OH} - V_{EH}.$$

The RTD Resistance ($R_H$) is calculated, as shown in operational block 716, wherein $R_H$ is given by:

$$R_H = \frac{V_H}{I_H}.$$

The New RTD Voltage ($V_{HNEW}$) is calculated, as shown in operational block 718, wherein $V_{HNEW}$ is given by:

$$V_{HNEW} = \sqrt{P \times R_H}.$$

The New Excitation Voltage ($V_{EH\_NEW}$) is calculated, as shown in operational block 720, wherein $V_{EH\_NEW}$ is given by:

$$V_{EH\_NEW} = R_{CSH} \times \frac{V_{HNEW}}{R_{CSH}}.$$

The $V_{DACH}$ is updated accordingly and this process may be repeated.

Referring to FIG. 11, an operational block diagram illustrating a method 800 for controlling power and read resistance on the second temperature measurement device 432 (i.e. the cold RTD) is shown in accordance with one embodiment. FIG. 12 illustrates one embodiment of an electronic circuit 675 which may be used for controlling power across the cold RTD 432 over the full temperature range via the method 800, wherein the electronic circuit 675 is configured to achieve the following coefficient relationships:

$$x_c = Vref \times \frac{R11}{R12}$$

$$y_c = \left(1 + \frac{R11}{R12\|R13}\right)$$

$$z_{1c} = \frac{R9\|R10}{R8+(R9\|R10)}$$

$$z_{2c} = \frac{R8\|R10}{R9+(R8\|R10)}$$

It should be appreciated that, in one embodiment, the resistor values for the electronic circuit 675 that determine the coefficients $x_c$, $y_c$, $z_{1c}$ and $z_{2c}$ may be set to achieve constant power across the full operating temperature, and it is typically desired to utilize the full input span of VADCC in the microcontroller. Moreover, in similar fashion to the hot leg 416, at the first iteration, a known DAC voltage ($V_{DACC}$) is set to resistance network R2 and the analog to digital conversion voltage ($V_{DACC}$) is measured. This value, along with the coefficients "x" and "y" are used to calculate VOut_Cold ($V_{OC}$). V_Excitation ($V_{EC}$) is calculated using the coefficients $z_{1c}$ and $z_{2c}$ along with the current DAC voltage ($V_{DACC}$). From $V_{EC}$ and the current sense resistance ($R_{RCSC}$), the current flowing through the cold sensor can be calculated as $I_C=V_{EC}/R_{RCSC}$. The cold sensor voltage can be calculated as $V_C=V_{OC}-V_{EC}$ and the cold RTD resistance can be calculated as $R_C=V_C/I_C$. Once all present values are known, the updated $V_{DACC}$ to maintain the desired power level can be calculated. The cold RTD voltage and cold RTD current which satisfies the desired power level is then calculated and the $V_{DACC}$ is updated accordingly and the process is repeated. This method is given in more detail herein after.

Referring again to FIG. 11 and FIG. 12, the method 800 includes calculating a new DAC ($V_{DACC\_NEW}$) setting, as shown in operational block 802, wherein $V_{DACC\_NEW}$ is given by:

$$V_{DACC\_NEW} = \frac{\dfrac{\sqrt{P \times RC}}{RC} \times R_{RCSC} - z_{1c}}{z_{2c}}$$

Once the new DAC setting is calculated, then the DAC value is set, as shown in operational block 804. At this point, the ADC value ($V_{ADCC}$) is read, as shown in operational block 806, and the output voltage VOut ($V_{OC}$) is calculated, as shown in operational block 808, wherein $V_{OC}$ is given by:

$$V_{OC} = \frac{V_{ADCC} + x_c}{y_c}.$$

The V_Excitation ($V_{EC}$) is then calculated, as shown in operational block 810, wherein $V_{EC}$ is given by:

$$V_{EC}=z_{1c}+z_{2c} \times V_{DACC}.$$

Using these values, the RTD Current ($I_C$) is calculated, as shown in operational block 812, wherein $I_C$ is given by:

$$I_C = \frac{V_{EC}}{R_{CSC}}.$$

The RTD Voltage ($V_C$) is calculated, as shown in operational block 814, wherein $V_C$ is given by:

$$V_C=V_{OC}-V_{EC}.$$

The RTD Resistance ($R_C$) is calculated, as shown in operational block 816, wherein $R_C$ is given by:

$$R_C = \frac{V_C}{I_C}.$$

The New RTD Voltage ($V_{CNEW}$) is calculated, as shown in operational block 818, wherein $V_{CNEW}$ is given by:

$$V_{CNEW}=\sqrt{P \times R_C}.$$

The New Excitation Voltage ($V_{EC\_NEW}$) is calculated, as shown in operational block 820, wherein $V_{EC\_NEW}$ is given by:

$$V_{EC\_NEW} = R_{CSC} \times \frac{V_{CNEW}}{R_{CSC}}.$$

The $V_{DACC}$ is then updated accordingly and this process is repeated.

Figure 13:
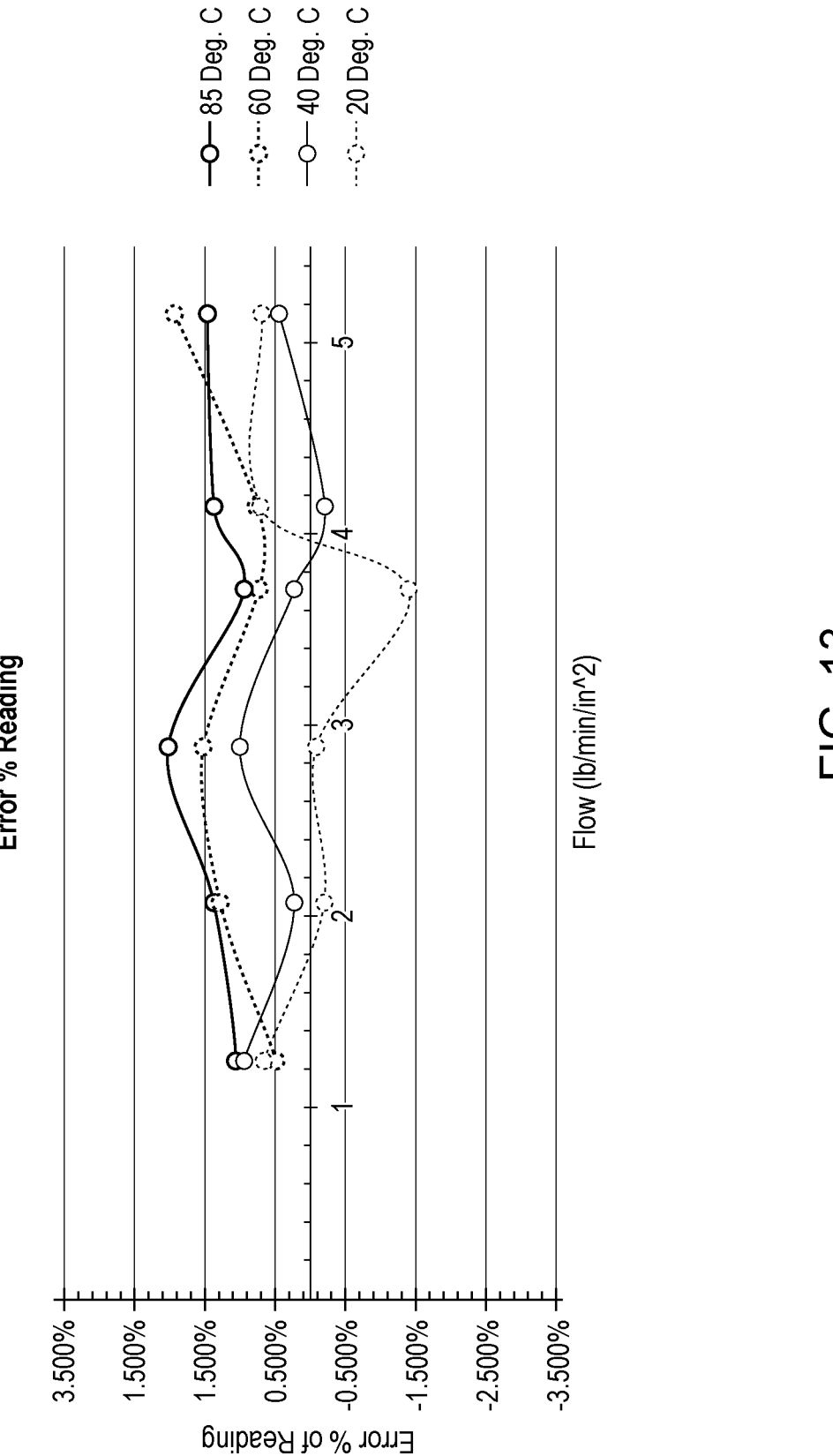
FIG. 13 is a graph showing the experimental result of flow of calibration up to 85° C., in accordance with one embodiment of the invention.

It should be appreciated that once the resistance $R_H$ for the hot leg 416 and the resistance $R_C$ for the cold leg 432 are determined for all flows and temperatures within a desired range, the resistances can be mapped to an absolute temperature reading through the Callendar-Van Dusen equation. A calibration table consisting of applied flows, temperatures and differential temperature measurement (hot leg temperature–cold leg temperature) may then be created, and during normal operation, may be used to interpolate to the desired flow value. One such example of a flow calibration up to 85° C. is illustrated in FIG. 13. In accordance with one embodiment of the invention, it should be appreciated the electronic circuit 650 in FIG. 10 is applicable to applying 0.4 W to a 100 ohm RTD and the electronic circuit 675 in FIG. 12 is applicable to applying 0.025 W to a 1000 ohm RTD. It should be appreciated that in other embodiments, other power and RTD combinations may be chosen as desired and as such, the corresponding equations may change slightly responsive to the power and RTD values selected.

Figure 15:
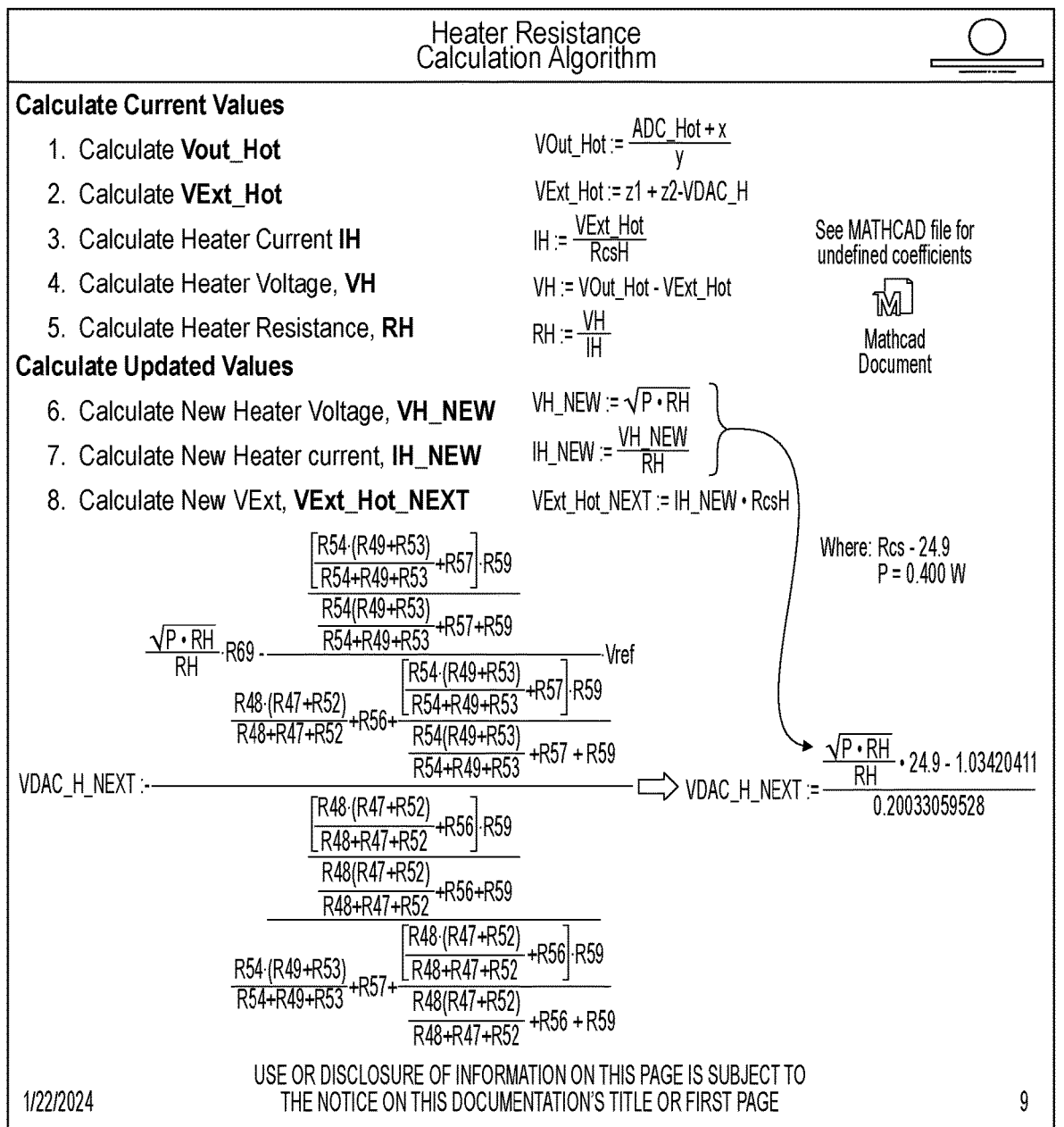
FIG. 15 illustrates an algorithm for determining Mass Flow Rate (MFR) using a Mass Flow Sensor (MFS), in accordance with one embodiment of the invention.

Referring to FIG. 14 and FIG. 15, an operational block diagram illustrating a method 900 for determining Mass Flow Rate (MFR) using a Mass Flow Sensor (MFS) 200, 400 having the electronic circuits 650, 675 of FIG. 10 and FIG. 12, in accordance with one embodiment of the invention, is provided and includes configuring the first and second sensor leg circuit, including setting first and second DAC to an initial setting, as shown in operational block 902. Referring to FIG. 9 and FIG. 11, the method 900 also includes calculating a first sensor voltage and first sensor current value for the first sensor leg and a second sensor voltage and a second current value for the second sensor leg, as shown in operational block 904. The method 900 further includes calculating the first sensor resistance and temperature values and the second sensor resistance and temperature values, as shown in operational block 906. The method 900 also includes determining the air flow and the air temperature responsive to the first sensor resistance value, the first sensor temperature value, the second sensor resistance value and the second sensor temperature value, as shown in operational block 908.

It should be appreciated that the method 900 further includes calculating a new first sensor voltage value and a new first sensor current value responsive to a first predetermined power value and a new second sensor voltage value and a new second sensor current value responsive to a second predetermined power value, as shown in operational block 910. Additionally, the method includes calculating a new first DAC setting responsive to the new first sensor voltage value, the new first sensor current value and first sensor leg circuit, and a new second DAC setting responsive to the new second sensor voltage value, the new second sensor current value and the second sensor leg circuit, as shown in operational block 912, and updating the first DAC with the new first DAC setting and the second DAC with the new second DAC setting, as shown in operational block 914. Lastly, the method 900 includes repeating the steps shown in operational block 906 to operational block 914.

It should be appreciated that the method 900 is configured to be applied to MFS 200, 400 that include electronic circuits 650, 675 in accordance with one embodiment. It should be appreciated that the invention as disclosed herein contemplates other embodiments that may not use the exact or even similar circuit configurations as used in electronic circuits 650, 675, but that may perform the methods disclosed herein and that thus, fall within the scope of the embodiments disclosed herein. It should be appreciated that FIG. 10 and FIG. 12 show only one embodiment of electronic circuits for use in processing the methods of the invention disclosed herein. It is contemplated that other embodiments may include one or more processing devices that may be configured for use in processing the methods of the invention, in whole or in part, as desired. Accordingly, the method(s) of the invention disclosed herein may be accomplished using any electronic circuitry and/or processing device suitable to the desired end purpose.

It should be appreciated that present invention may be automatically controlled via a processing device as desired. Thus, it is contemplated that the processing device may monitor the system and make automatic adjustments as required. In accordance with the present invention, the method 600, 700, 800, 900 may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, power drivers, current monitoring, temperature sensing/reading articles, a processor(s), computer(s), memory, storage, register(s), timing, interrupt(s), communication interface(s), and input/output signal interface(s), as well as combination comprising at least one of the foregoing. Additionally, the controller (software, firmware and/or any other means of control may monitor proper operation of the system. In case a fault is detected it may switch to a redundant system/component (failure could be due to lightning strike or any other problem).

Moreover, the method 600, 700, 800, 900 may be embodied in the form of a computer or controller implemented processes. The method may also be embodied in the form of computer program code containing instructions embodied in tangible media, such as floppy diskettes, CD-ROMs, hard drives, Solid State Drives (SSD) and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A mass flow sensor comprising:

a housing;

a first sensor leg extending away from the housing and including a first sensor leg housing defining a first sensor leg cavity and a first singular sensing element, the first singular sensing element being a single first Resistive Temperature Detector (RTD), disposed in the first sensor leg cavity, the single first RTD configured for measuring resistance and heating the first sensor leg, wherein power across the single first RTD is controlled by a control algorithm to heat the first sensor leg, an electronic circuit for controlling power across the first singular sensing element, the electronic circuit including a plurality of resistive elements that include a first resistive element, a second resistive element, a third resistive element, a fourth resistive element, a fifth resistive element, a sixth resistive element, and a seventh resistive element, wherein each of the plurality of resistive elements includes one or more resistive elements in parallel or series;

a second sensor leg extending away from the housing and including a second sensor leg housing defining a second sensor leg cavity and a second singular sensing element, the second singular sensing element being a single second RTD disposed in the second sensor leg cavity, the single second RTD configured for measuring resistance and heating the second sensor leg, wherein power across the single second RTD is less than the power across the single first RTD and is controlled by the control algorithm to heat the second sensor leg;

an airfoil structure defining a cavity housing the first and second legs; and a processing device disposed in the housing and configured to operate responsive to the control algorithm that simultaneously heats and measures the resistance of the single first RTD and the single second RTD and determines a mass airflow speed by calculating a differential between the resistance of the first single RTD and the resistance of the second single RTD.

2. The mass flow sensor according to claim 1, further comprising a first leg analog-to-digital converter for receiving a signal from the first RTD and delivering the signal to the processing device, a first leg digital-to-analog converter for receiving a signal from the processing device and delivering the signal to the first RTD, a second leg analog-to-digital converter for receiving a signal from the second RTD and delivering the signal to the processing device, and a second leg digital-to-analog converter for receiving a signal from the processing device and delivering the signal to the second RTD.

3. The mass flow sensor according to claim 1, further comprising a temp digital-to-analog converter (TDAC), a flow digital-to-analog converter (FDAC), and scaling circuitry for scaling outputs of the TDAC and the FDAC.

4. The mass flow sensor according to claim 1, further comprising a mounting structure having a mounting structure top and a mounting structure bottom, wherein the housing is associated with the mounting structure top and the first and second sensor legs extend away from the mounting structure bottom.

5. The mass flow sensor according to claim 1, wherein the airfoil structure includes a housing defining the cavity and having a leading edge, a trailing edge, first and second sides, a top, and a bottom.

6. The mass flow sensor according to claim 5, further comprising at least one bottom opening in the bottom and at least one side vent opening on at least one of the first and second sides.

7. The mass flow sensor according to claim 6, wherein the at least one bottom opening and the at least one side vent opening are in communication with the cavity.

8. The mass flow sensor according to claim 6, wherein the at least one side vent opening includes a plurality of side vent openings.

9. The mass flow sensor according to claim 1, wherein the control algorithm is configured to determine the power applied to the first and second RTDs, compare the power applied with a respective desired power value, and adjust the power applied based on the comparison.

10. A mass flow sensor comprising:
   a housing;
   a first sensor leg extending away from the housing and including a first singular sensing element, the first singular sensing element being a single first temperature measurement device configured for measuring resistance and heating the first sensor leg, wherein the first sensor leg is free of a heating element separate from the first singular sensing element, and wherein power across the single first temperature measurement device is controlled by a control algorithm to heat the first sensor leg;
   a second sensor leg extending away from the housing and including a second singular sensing element, the second singular sensing element being a single second temperature measurement device configured for measuring resistance and heating the second sensor leg, wherein the second sensor leg is free of a heating element separate from the second singular sensing element, and wherein power across the single second temperature measurement device is less than the power across the single first temperature measurement device and is controlled by a control algorithm to heat the second sensor leg;
   an airfoil structure defining a cavity housing the first and second legs; and
   a processing device disposed in the housing and configured to operate responsive to the control algorithm that simultaneously heats and measures the resistance of the single first temperature measurement device and the single second temperature measurement device and determines a mass airflow speed by calculating a differential between the resistance of the single first temperature measurement device and the resistance of the single second temperature measurement device.

11. The mass flow sensor according to claim 10, further comprising a first leg analog-to-digital converter for receiving a signal from the first temperature measurement device and delivering the signal to the processing device, a first leg digital-to-analog converter for receiving a signal from the processing device and delivering the signal to the first temperature measurement device, a second leg analog-to-digital converter for receiving a signal from the second temperature measurement device and delivering the signal to the processing device, and a second leg digital-to-analog converter for receiving a signal from the processing device and delivering the signal to the second temperature measurement device.

12. The mass flow sensor according to claim 10, further comprising a temp digital-to-analog converter (TDAC), a flow digital-to-analog converter (FDAC), and scaling circuitry for scaling outputs of the TDAC and the FDAC.

13. The mass flow sensor according to claim 10, further comprising a mounting structure having a mounting structure top and a mounting structure bottom, wherein the housing is associated with the mounting structure top and the first and second sensor legs extend away from the mounting structure bottom.

14. The mass flow sensor according to claim 10, wherein the airfoil structure includes a housing defining the cavity and having a leading edge, a trailing edge, first and second sides, a top, and a bottom, at least one bottom opening in the bottom, and at least one side vent opening on at least one of the first and second sides.

15. The mass flow sensor according to claim 14, wherein the at least one bottom opening and the at least one side vent opening are in communication with the cavity.

16. The mass flow sensor according to claim 14, wherein the at least one side vent opening includes a plurality of side vent openings.

17. The mass flow sensor according to claim 10, wherein the control algorithm is configured to determine the power applied to the first and second temperature measurement devices, compare the power applied with a respective desired power value, and adjust the power applied based on the comparison.

18. A mass flow sensor comprising:
   a housing;
   a first sensor leg extending away from the housing and including a first singular sensing element, the first singular sensing element being a single first temperature measurement device configured for measuring resistance and heating the first sensor leg, wherein the first sensor leg is free of a heating element separate from the first singular sensing element, and wherein power across the single first temperature measurement device is controlled by a control algorithm to heat the first sensor leg;
   a second sensor leg extending away from the housing and including a second singular sensing element, the second singular sensing element being a single second temperature measurement device configured for measuring resistance and heating the second sensor leg, wherein the second sensor leg is free of a heating element separate from the second singular sensing element, and wherein power across the single second temperature measurement device is less than the power across the single first temperature measurement device and is controlled by the control algorithm to heat the second sensor leg;
   an airfoil structure including a housing defining a cavity housing the first and second legs and having a leading edge, a trailing edge, first and second sides, a top, and a bottom, and a plurality of side vent openings on at least one of the first and second sides; and
   a processing device disposed in the housing and configured to operate responsive to the control algorithm that simultaneously heats and measures the resistance of the single first temperature measurement device and the single second temperature measurement device and determines a mass airflow speed by calculating a differential between the resistance of the single first temperature measurement device and the resistance of
the single second temperature measurement device.

* * * * *